(12) United States Patent
Lepsch et al.

(10) Patent No.: US 11,519,370 B2
(45) Date of Patent: Dec. 6, 2022

(54) SYSTEM AND METHOD OF MANAGING THE TEMPERATURE OF FUEL INJECTED INTO INTERNAL COMBUSTION ENGINES

(71) Applicant: Robert Bosch Limitada, Campinas (BR)

(72) Inventors: Fernando Lepsch, Campinas (BR); Marcello Francisco Brunocilla, Indaiatuba (BR); Fernando de Oliveira Junior, Campinas (BR)

(73) Assignee: Robert Bosch Limitada, Campinas (BR)

( * ) Notice: Subject to any disclaimer, the term of this patent is extended or adjusted under 35 U.S.C. 154(b) by 0 days.

(21) Appl. No.: 17/130,781

(22) Filed: Dec. 22, 2020

(65) Prior Publication Data

US 2021/0199080 A1 Jul. 1, 2021

(30) Foreign Application Priority Data

Dec. 26, 2019 (BR) .......................... 102019027843-9

(51) Int. Cl.
*F02M 53/02* (2006.01)
*F02M 31/125* (2006.01)

(52) U.S. Cl.
CPC .......... *F02M 53/02* (2013.01); *F02M 31/125* (2013.01)

(58) Field of Classification Search
USPC ................................. 123/557, 294, 445, 549
See application file for complete search history.

(56) References Cited

U.S. PATENT DOCUMENTS

| 4,108,953 | A | * | 8/1978 | Rocco | F02M 15/04 261/142 |
| 4,137,872 | A | * | 2/1979 | Loflin | F02M 31/18 123/557 |
| 4,345,141 | A | * | 8/1982 | Little | F02M 31/125 219/207 |
| 4,665,881 | A | * | 5/1987 | Wade | F02M 53/02 123/447 |
| 5,050,569 | A | * | 9/1991 | Beunk | F02M 53/06 123/549 |
| 5,511,530 | A | * | 4/1996 | Buringrud | F02M 31/125 123/549 |
| 7,669,585 | B2 | | 3/2010 | Haag et al. | |

(Continued)

FOREIGN PATENT DOCUMENTS

BR PI0902488 A2 4/2010
DE 102015114716 A1 * 3/2017

(Continued)

OTHER PUBLICATIONS

United States Patent Office Action for U.S. Appl. No. 17/132,932 dated Jun. 18, 2021 (7 pages).

(Continued)

*Primary Examiner* — George C Jin
*Assistant Examiner* — Teuta B Holbrook
(74) *Attorney, Agent, or Firm* — Michael Best & Friedrich LLP

(57) ABSTRACT

A system and a method of controlling the temperature of fuel injected into combustion engines, which provides a reduced amount of fuel injected into engines propelled with either pure gasoline or ethanol or any bi-fuel mixture by precisely controlling the amount of heat supplied to the fuel.

8 Claims, 4 Drawing Sheets

(56) References Cited

U.S. PATENT DOCUMENTS

| | | | |
|---|---|---|---|
| 7,942,136 B2* | 5/2011 | Lepsch | F02M 55/02 |
| | | | 123/549 |
| 8,936,010 B2 | 1/2015 | Costa et al. | |
| 9,163,593 B2* | 10/2015 | Kim | F02M 31/125 |
| 9,303,606 B2* | 4/2016 | Moreira Coletto | F02M 53/06 |
| 9,695,759 B2 | 7/2017 | Windbergs et al. | |
| 2003/0183209 A1* | 10/2003 | Rigney | F01N 5/02 |
| | | | 123/557 |
| 2004/0003801 A1* | 1/2004 | Linna | F02M 53/06 |
| | | | 123/549 |
| 2005/0126551 A1 | 6/2005 | Mello et al. | |
| 2005/0263136 A1* | 12/2005 | Rigney | F02M 53/06 |
| | | | 123/470 |
| 2007/0227494 A1* | 10/2007 | Cheiky | F02M 53/06 |
| | | | 123/304 |
| 2007/0283927 A1* | 12/2007 | Fukumoto | F28D 7/024 |
| | | | 123/445 |
| 2009/0107473 A1 | 4/2009 | Imoehl et al. | |
| 2009/0133676 A1* | 5/2009 | Lepsch | F02M 55/02 |
| | | | 123/549 |
| 2009/0178651 A1* | 7/2009 | Gale | F02M 31/125 |
| | | | 123/549 |
| 2009/0241915 A1 | 10/2009 | Sales | |
| 2009/0266343 A1* | 10/2009 | Lecca | F02M 31/18 |
| | | | 123/557 |
| 2011/0073080 A1* | 3/2011 | Sasagawa | F02M 55/025 |
| | | | 123/557 |
| 2011/0226221 A1* | 9/2011 | Roland | F02M 27/045 |
| | | | 123/557 |
| 2012/0048962 A1* | 3/2012 | Short | F02M 53/06 |
| | | | 239/13 |
| 2012/0224839 A1* | 9/2012 | Zorzetto | F02M 53/06 |
| | | | 392/485 |
| 2014/0360456 A1* | 12/2014 | Gaul | F02B 53/10 |
| | | | 123/208 |
| 2015/0090230 A1 | 4/2015 | Bolz et al. | |
| 2018/0291833 A1 | 10/2018 | Sukegawa et al. | |

FOREIGN PATENT DOCUMENTS

| | | | | |
|---|---|---|---|---|
| JP | 2014206100 A | * | 10/2014 | Y02T 10/12 |
| WO | 2017221036 A1 | | 12/2017 | |
| WO | 2017221039 A1 | | 12/2017 | |

OTHER PUBLICATIONS

United States Patent Office Action for U.S. Appl. No. 17/132,932 dated Nov. 18, 2021 (9 pages).

* cited by examiner

SYSTEM AND METHOD OF MANAGING THE TEMPERATURE OF FUEL INJECTED INTO INTERNAL COMBUSTION ENGINES

BACKGROUND

The present invention relates to a system and a method of controlling the temperature of fuel injected into combustion engines, which provides a reduced amount of fuel injected into engines propelled with either pure gasoline or ethanol or any bi-fuel mixture by precisely controlling the amount of heat supplied to the fuel.

In recent years problems relative to the amount of pollutants (HC, CO, $CO_2$ and particulates) emitted mainly by car engines have been a major problem for large cities. Thus, new technologies have been developed to help reduce pollutant emissions from internal combustion engines.

In order to mitigate the emission of greenhouse gases from automobiles and reduce the dependence on fossil fuels, several alternatives for substituting internal combustion engines are available. However, the best solution to this dilemma must consider the country's geographical and socioeconomic characteristics, its energy matrix, emission regulations and the environmental impact of carbon fuel emissions throughout its life cycle.

Brazil has a strong reputation for its fleet of bi-fuel vehicles, long experience in the use of fuel ethanol and its distribution network. It sets Brazil apart from other global markets and justifies a unique approach to reduce $CO_2$ emissions.

However, there are limitations in the use of bi-fuel engines (popularly known as "flex" engines). To meet the demand for using two fuels in a single tank, sizing of a flex engine tends to be intermediate, as sizing of single-fuel engines is different depending on the use of either ethanol or gasoline fuel. This is because the vast majority of biofuel engines usually have a single geometric compression ratio, which represents the proportion between the aspirated volume plus the volume of the combustion chamber relative to the volume of the combustion chamber).

The piston reaches the upper and lower ends of its stroke, which are designated respectively Top Dead Center (TDC) and Bottom Dead Center (BDC).

Operation of a passenger car engine usually has four strokes:
 Intake
 Compression
 Combustion
 Exhaust Effect of the compression ratio is shown in the second stroke—the intake valves close after injection of the air/fuel mixture and it is compressed for combustion to begin. Thus, the geometric compression ratio of the engine is achieved: the ratio of the volume of the piston combustion chamber at the Bottom Dead Center (greatest volume) to the volume at the Top Dead Center (lowest volume).

Gasoline engines typically use lower compression ratios (typically between 8:1 and 12:1), while ethanol-powered engines work best at higher ratios (12:1 or even 14:1).

However, before the fuel reaches the combustion chamber, it travels a path starting in the vehicle's tank. This fuel is moved by a fuel pump and flows through pipelines that transport fuel—first, a hose and, later, a more rigid and branched pipeline designates as a gallery. Branches transport the fuel to be injected into the respective cylinders and at the outlet of these branches fuel injectors are placed.

When engines using the Otto cycle are concerned (engines traditionally used in cars), both Port Fuel Injection (PFI) and Direct Injection (DI) engines emit particulates in amounts greater than the permitted limits. Thus, the use of a particle filter for gasoline engines (GPF, Gasoline Particulate Filter) has been recommended in order to comply with the new legislation on particulate emissions that came into force.

However, even with the use of GPF, engines can still generate particulate matter in amounts greater than the limits dictated by official Health Agencies, since pollutant emissions also depend on the manner the drivers behave while driving and on proper maintenance of the vehicles.

In addition, impingement of fuel onto the piston surface or on the intake duct walls can contribute to the increased particle emission. Also, fuel condensation in cold areas of the engine may result in incomplete combustion, generating hydrocarbons and carbon monoxide (HC and CO).

Therefore, one of the most effective techniques for correctly burning fuel is to deliver it previously heated to the combustion chamber.

In this sense, some solutions are already known, such as that described in patent document PI 0902488-3. Said document discloses a fuel heater for internal combustion engines provided with a device for determining the fuel temperature and pressure, adjusting the target fuel temperature according to the fuel pressure detected by a pressure sensor and a fuel temperature controlling device that controls the fuel heater in order to adjust the temperature detected by a sensor to the target fuel temperature.

However, in the invention described in said patent document the use of a fuel pressure sensor is mandatory, causing the target temperature to be adjusted in accordance with the measured fuel pressure. In addition, the technique described in this document makes no mention of the need of knowing the temperature upstream of the heater, which makes the calculation of the power required to heat the fuel even less accurate, not satisfactorily meeting the requirement to achieve reduced emissions of pollutant gases.

Another technique related to the present problem is described in patent document WO2017/221036. In general, this invention describes a vehicle that has reduced fuel injection volumes due to fuel heating. In more detail, this document describes a vehicle with an internal combustion engine provided with at least one heater to heat the fuel before it is delivered to the cylinder by the fuel injector; a fuel pump to supply fuel to the heater, and an electronic controller to control the torque of the engine and the fuel pressure generated by the pump, the engine controller using a model based on heating the heated fuel from the engine to control the amount of heated fuel supplied by the fuel injector, so as to reduce the amount of fuel injected for a given engine torque relative to unheated fuel; and to cause higher fuel pressure to be generated by the fuel pump as compared to unheated fuel.

The technique described in patent document WO2017/221039 describes a system in which the amount of fuel injected into the engine is controlled and the fuel pressure is increased based on a fuel heating model relative to an unheated model. In other words, it uses a very complicated logic, which uses two injection controlling methods.

However, none of the documents cited in the state of the art provides for a relatively simple and inexpensive technique for controlling the temperature of the fuel to be injected, in order to successfully achieve reduced $CO_2$ emissions.

SUMMARY

Thus, the present invention is intended to solve the problems of the state of the art in a much more simplified and efficient manner.

The present invention is intended to provide a temperature management system for fuel injected into internal combustion engines, said system being provided with a temperature sensor capable of measuring the fuel temperature immediately after preheating so as it is thereafter injected, providing great precision in the amount of power supplied to the heater, accuracy in the fuel preheating temperature and, accordingly, great precision in the reduction of pollutant gases.

Moreover, the present invention is intended to provide a method for managing the temperature of fuel injected into internal combustion engines that can be applied to said system, which takes into account the measurement of the fuel temperature immediately after preheating to be thereafter injected, calculating with great precision the amount of power to be supplied to the heater, providing accuracy of the fuel preheating temperature and, accordingly, great precision in the reduction of pollutant gases.

In order to solve the technical problem and overcome the drawbacks of the state of the art, the present invention is intended to provide a temperature management system for fuel injected into internal combustion engines, which is provided with:
- at least one fuel transporting line;
- a fuel distribution system associated with the fuel transporting line having at least one main duct and at least one branch; a fuel injecting device associated with the branch and at least one fuel heating device provided with a heating chamber, said heating device being placed adjacent to the fuel injecting device;
- at least one electronic control device associated with the fuel injecting device;
- at least one fuel heating control device associated with the electronic control device and associated with at least one fuel heater;

said system comprising at least one temperature sensor subsequently mechanically associated with the fuel heating device relative to the fuel flow and electrically associated with the electronic control device.

In addition, the present invention overcomes the issues of the state of the art by providing a method for managing the temperature of fuel injected into internal combustion engines, being provided with:
- at least one fuel transporting line;
- a fuel distribution system associated with the fuel transporting line having at least one main duct and at least one branch; a fuel injecting device associated with the branch and at least one fuel heating device provided with a heating chamber, said heating device being placed adjacent to the fuel injecting device;
- at least one electronic control device associated with the fuel injecting device;
- at least one fuel heating control device associated with the electronic control device and associated with at least one fuel heater;
- wherein the said method comprises the steps of:
- measuring the fuel temperature downstream of the heating device by means of a temperature sensor associated with the fuel heating device;
- reading a target fuel temperature downstream of the heating device previously inserted and stored;
- processing the signal referring to the fuel temperature;
- performing an action.

DETAILED DESCRIPTION

Figure 1:
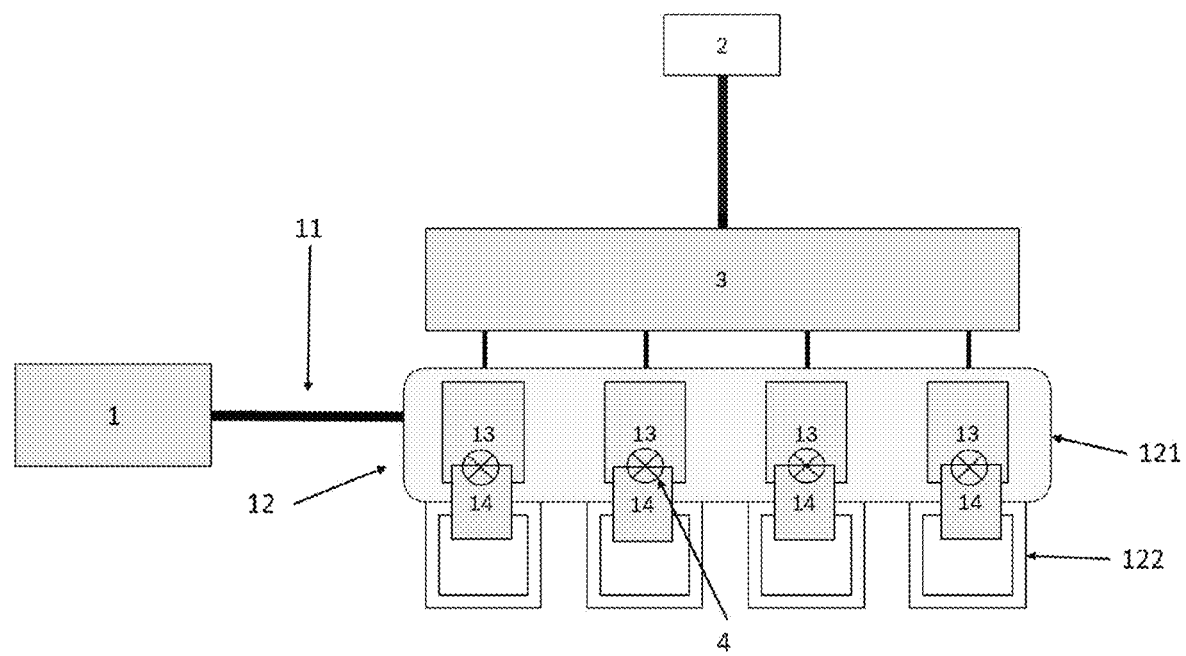
FIG. 1—Scheme of a first embodiment of the temperature management system.
Figure 2:
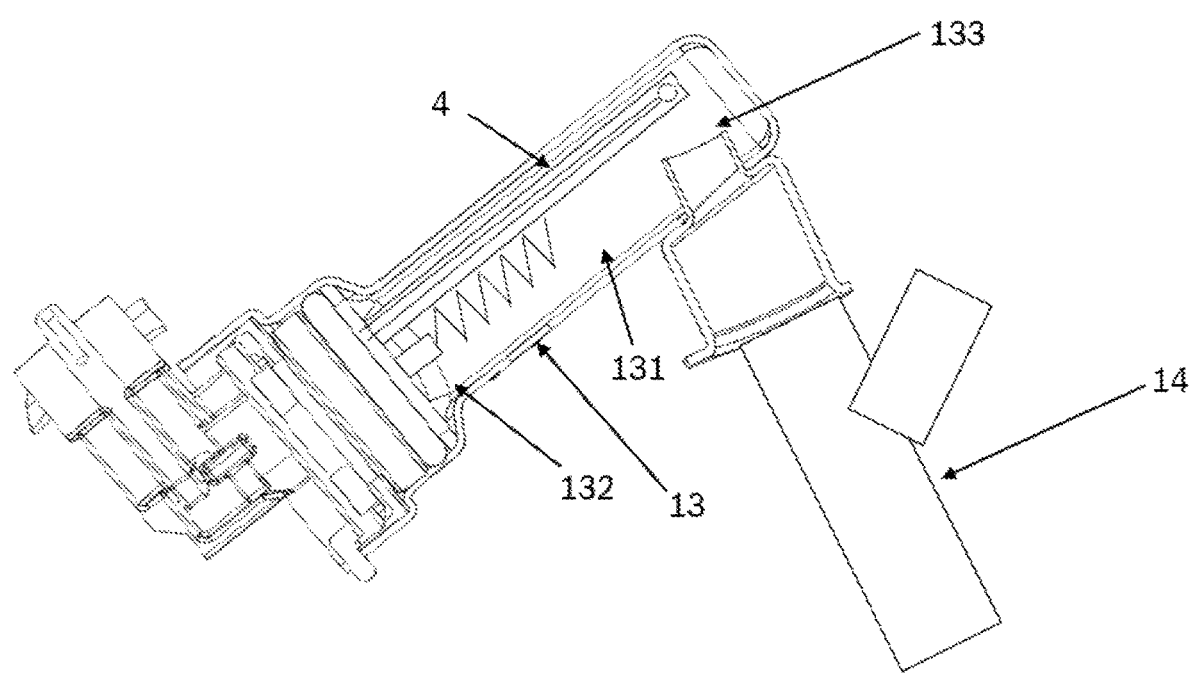
FIG. 2—Detail of the fuel heating device.
Figure 3:
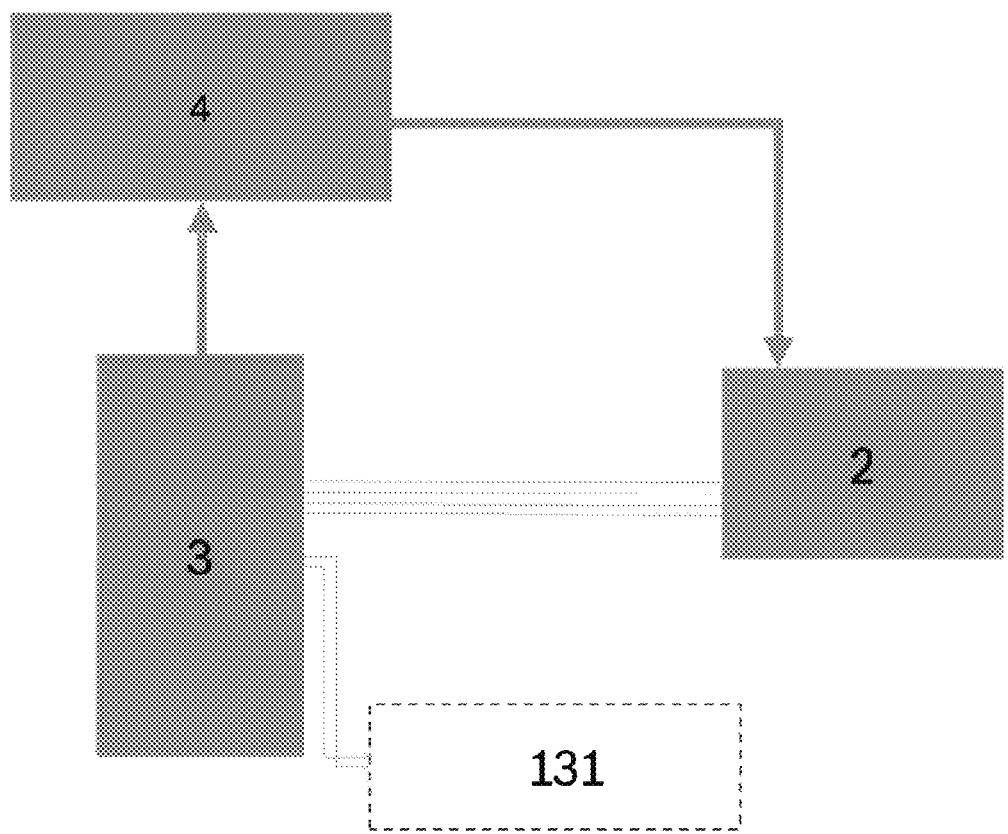
FIG. 3—Diagram of the injected fuel temperature management method.
Figure 4:
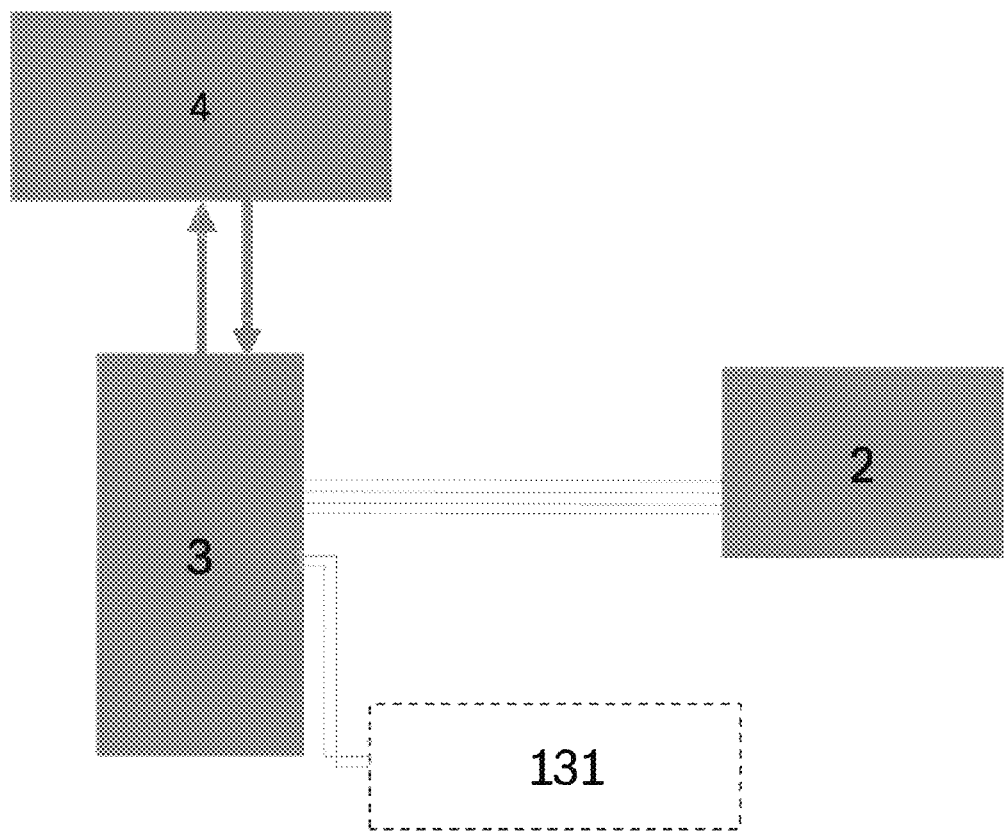
FIG. 4—Diagram of the injected fuel temperature management method.

The fuel heating and heating management system is responsible for heating the fuel to be injected into the engine to a predetermined temperature. Heating of the fuel is aimed at improving spraying of the injected fuel, reducing its droplet size, which means a better preparation of the air-fuel mixture leading to a more homogeneous mixture, which will lead to a reduced amount of injected fuel, hence reducing the amount of emitted gases and particulates.

Operation of the heating system begins when the engine starts. Management of the system is intended to keep the injected fuel temperature at the target temperature at all times. To this end, the system determines the amount of power to be supplied to the fuel based on the temperature of the fuel exiting the heating device and immediately entering the injector device (in this case, an injector), and the type of fuel that is being injected.

Thus, the present invention describes a system for managing the temperature of fuel injected into internal combustion engines, being provided with:
- at least one fuel transporting line 11;
- at least one fuel distribution system 12 associated with the fuel transporting line 11 having at least one main duct 121 and at least one branch 122; a fuel injecting device 14 associated with the branch 122 and at least one fuel heating device 13 provided with a heating chamber 131, said heating device 13 being placed adjacent to the fuel injecting device;
- at least one electronic control device 2 associated with the fuel injecting device 14;
- at least one fuel heating control device 3 associated with the electronic control device 2 and associated with at least one fuel heater 13;

said system comprising at least one temperature sensor 4 subsequently mechanically associated with the fuel heating device 13 relative to the fuel flow and electrically associated with the electronic control device 2. This association can occur directly or through the fuel heating control device 3.

In a first preferred alternative embodiment, the present invention describes a temperature management system for fuel injected into internal combustion engines, so that the fuel transporting line 11 comprises a low pressure line. The low pressure line can be used both in Port Fuel Injection (PFI) engines and those engines that use an additional high pressure line (PDI).

In a second alternative embodiment, the present invention describes a temperature management system for fuel injected into internal combustion engines, so that the fuel transporting line 11 comprises a high pressure line. The high pressure line can be used both in direct injection engines (DI) and in those engines that use an additional low pressure line (PDI).

In a third alternative embodiment, the present invention describes a temperature management system for fuel injected into internal combustion engines, wherein the fuel heating device 13 includes a heating chamber 131 provided with a fuel inlet portion 132 and a fuel outlet portion 133 distal from the inlet portion 132.

In a fourth alternative embodiment, the present invention describes a temperature management system of fuel injected into internal combustion engines, so that the fuel heating device 13 includes a heating chamber 131 provided with a fuel inlet portion 132 placed at a lower region of said heating chamber 131 and an outlet portion 133 placed at an upper region of said heating chamber 131.

In a fifth alternative embodiment, the present invention describes a temperature management system for fuel injected into internal combustion engines, so that the temperature sensor 4 is associates with the outlet portion 133 of the heating chamber 131 of the fuel heating device. It is understood that this is one of the preferred embodiments of the present invention. Anyway, any other mounting and assembly positions of the temperature sensor are possible, as long as it is placed after the heating device. However, the closer to the heating device 3 outlet, the more accurate the measurement of fuel temperature.

According to the aforementioned embodiments, the configuration of the heating device 13 provides an even heating of the fuel, as it enters the heating chamber 131 through a first opening 132 located at its lower region, it is obliged to fully pass through the heating device 13—effecting the thermal exchange—and exits heated by the second opening 133 located at an upper region.

Thus, the present invention describes a method for managing the temperature of fuel injected into internal combustion engines, being provided with:
  at least one fuel transporting line 11;
  at least one fuel distribution system 12 associated with the fuel transporting line 11 having at least one main duct 121 and at least one branch 122; a fuel injecting device 14 associated with the branch 122 and at least one fuel heating device 13 provided with a heating chamber 131, said heating device 13 being placed adjacent to the fuel injecting device;
  at least one electronic control device 2 associated with the fuel injecting device 14;
  at least one fuel heating control device 3 associated with the electronic control device 2 and associated with at least one fuel heater 13;
wherein the said method comprises the steps of:
  measuring the fuel temperature downstream of the heating device 13 by means of a temperature sensor 4 associated with the fuel heating device;
  reading a target fuel temperature downstream of the heating device 13 previously inserted and stored;
  processing the signal referring to the fuel temperature;
  performing an action.

The target temperature is preferably previously entered and stored in the electronic control device 2. However, alternatively, such information can be previously entered and stored in the fuel heating control device 3.

In a first alternative embodiment, the present invention describes a method for managing the temperature of fuel injected into internal combustion engines, so that the step of processing the signal referring to the fuel temperature comprises the steps of:
  comparing the measured fuel temperature downstream of the heating device 13 and the target temperature downstream of the heating device 13;
  calculating the amount of power to be applied to the heating device 13;
  applying the calculated power in the heating device 13 under the control of the heating control device 3.

In a second alternative embodiment, the present invention describes a method of managing the temperature of fuel injected into internal combustion engines, so that the step of performing an action comprises an action selected from turning the heating device off 13 and processing the signal referring to the fuel temperature. The heating device 13 does not heat the fuel when the temperature downstream of the heater 13 is equal to or greater than the target temperature. For example, after working for a long time, the engine heats up and begins to heat the components surrounding it. The engine temperature can be such that it causes the incoming fuel to warm up to the target temperature without requiring turning on the fuel heating device 13. In this case, the heater 13 is switched off to save energy, since heating of fuel by heaters 13 is no longer necessary.

In a third alternative embodiment, the present invention describes a method of managing the temperature of fuel injected into internal combustion engines, so that the target temperature of the fuel downstream of the heating device 13 is previously entered and stored in the electronic control device 2 or heating control device 3.

The fuel temperature downstream of the heating device 13 is obtained by directly measuring the fuel temperature by the temperature sensor 4 located at the outlet portion 133 of the heating chamber 131 of the fuel heating device 13.

An aspect of the present invention that is essential so that reduced pollutant emissions is achieved is the temperature of the injected fuel. The temperature of the fuel downstream of heater 13 must be known. In order to know the temperature of the injected fuel, a temperature sensor 4 can be placed at the outlet of the fuel gallery 12 or at the injector 14. One can place a sensor 4 for each outlet (for each injector 14) as shown in FIG. 1, or use one outlet as a master (it will be the fuel temperature of reference for all injectors, regardless of the number of cylinders). When one sensor 4 is used for each injector 14, the power applied to all heaters 13 will be such that the target temperature is obtained equally downstream of each heater 13, regardless of a possible imbalance between the resistances of each heater 13.

Under some dynamic conditions, both a sudden acceleration and a severe deceleration can be requested by the driver. In these instances, a great variation in the accelerator pedal takes place, which is detected by the engine management system. Therefore, the engine management system can predict whether the engine will require more or less fuel mass. Thus, it anticipates the injection of a greater or lesser volume of fuel to meet acceleration or deceleration based on a predetermined fuel volume for that engine speed transition. Therefore, based on this same concept, the fuel management system can anticipate fuel heating. In this case, a pre-targeting or anticipated storage of power for heating the fuel can be determined in the heating control device 3, anticipating heating of the fuel, so that the fuel temperature remains at the target temperature, even with the sudden variation in fuel flow.

Thus, during severe acceleration changes, no alterations occur in the fuel temperature, since the heating control device 3 has previously heated the fuel. In addition, heating the fuel during these dynamic maneuvers also provides a reduction in the level of pollutants emitted, as such maneuvers contribute to increase the total level of car emissions.

Thus, it should be noted that, as described above, the present invention achieves the goal of providing a system and method for managing the temperature of fuel injected into internal combustion engines.

Thus, the present invention also provides an increase in the power drawn from the engine associated with lower gasoline consumption and consequent reduction of $CO_2$ and other pollutant gases emitted by the engines.

The invention claimed is:

1. A system for managing the temperature of fuel injected into internal combustion engines, the system including:
   at least one fuel transporting line (11);
   at least one fuel distribution system (12) associated with the at least one fuel transporting line (11) having at least one main duct (121) and at least one branch (122);
   a fuel injecting device (14) associated with the at least one branch (122) and at least one fuel heating device (13) provided within a heating chamber (131), said at least one fuel heating device (13) being placed adjacent to and upstream of an inlet end of the fuel injecting device, the heating chamber (131) configured to receive the fuel therein;
   at least one electronic control device (2) associated with the fuel injecting device (14); and at least one fuel heating control device (3) associated with the at least one electronic control device (2) and associated with the at least one fuel heating device (13);
   said system being characterized in that it comprises at least one temperature sensor (4) positioned within the heating chamber (131) and electrically associated with the at least one electronic control device (2);
   wherein the heating chamber (131) is provided with a fuel inlet portion (132) and a fuel outlet portion (133) distal from the fuel inlet portion (132); and,
   wherein the fuel inlet portion (132) is placed at a lower region of said heating chamber (131) and the fuel outlet portion (133) is placed at an upper region of said heating chamber (131).

2. The system for managing the temperature of fuel injected into internal combustion engines of claim 1, characterized in that the at least one fuel transporting line (11) comprises a low pressure line.

3. The system for managing the temperature of fuel injected into internal combustion engines of claim 1, characterized in that the at least one fuel transporting line (11) comprises a high pressure line.

4. The system for managing the temperature of fuel injected into internal combustion engines of claim 1, characterized in that the at least one temperature sensor (4) is associated with the fuel outlet portion (133) of the heating chamber (131) of the at least one fuel heating device (13).

5. A method for managing the temperature of fuel injected into internal combustion engines, being provided with:
   at least one fuel transporting line (11);
   at least one fuel distribution system (12) associated with the at least one fuel transporting line (11) having at least one main duct (121) and at least one branch (122);
   a fuel injecting device (14) associated with the at least one branch (122) and at least one fuel heating device (13) provided within a heating chamber (131), said at least one fuel heating device (13) being placed adjacent to and upstream of an inlet end of the fuel injecting device, the heating chamber (131) configured to receive the fuel therein;
   the heating chamber (131) provided with a fuel inlet portion (132) and a fuel outlet portion (133) distal from the fuel inlet portion (132);
   the fuel inlet portion (132) placed at a lower region of said heating chamber (131) and the fuel outlet portion (133) is placed at an upper region of said heating chamber (131);
   at least one electronic control device (2) associated with the fuel injecting device (14); and at least one fuel heating control device (3) associated with the at least one electronic control device (2) and associated with the at least one fuel heating device (13);
   characterized in that the method comprises the steps of:
   measuring the fuel temperature downstream of the at least one fuel heating device (13) by means of a temperature sensor (4) positioned within the heating chamber (131) and being associated with the at least one fuel heating device (13);
   reading a previously stored target fuel temperature for fuel downstream of the at least one fuel heating device (13);
   processing a signal referring to the measured fuel temperature; and
   performing an action.

6. The method for managing the temperature of fuel injected into internal combustion engines of claim 5, characterized in that the step of processing the signal referring to the measured fuel temperature comprises the steps of:
   comparing the measured fuel temperature downstream of the at least one fuel heating device (13) and the previously stored target fuel temperature for fuel downstream of the at least one fuel heating device (13);
   calculating an amount of power to be applied to the at least one fuel heating device (13); and applying the calculated amount of power to the at least one fuel heating device (13) under the control of the at least one fuel heating control device (3).

7. The method of managing the temperature of fuel injected into internal combustion engines of claim 5, characterized in that the step of performing an action comprises an action selected from turning the at least one fuel heating device (13) off and processing the signal referring to the fuel temperature.

8. The method of managing the temperature of fuel injected into internal combustion engines of claim 5, characterized in that the target fuel temperature for the fuel downstream of the at least one fuel heating device (13) is previously entered and stored in the at least one electronic control device (2) or in the at least one fuel heating control device (3).

* * * * *